US006083437A

United States Patent [19]

Nishio et al.

[11] Patent Number: 6,083,437

[45] **Date of Patent: *Jul. 4, 2000**

[54] METHOD FOR DIMENSIONAL STABILIZING TREATMENT OF WOOD AND WOOD COMPOSITE

[75] Inventors: Jiro Nishio; Takashi Kimura; Yukari Seto, all of Osaka, Japan

[73] Assignee: Eidai Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/896,602

[22] Filed: Jul. 18, 1997

[30] Foreign Application Priority Data

| | | | |
|---|---|---|---|
| Jul. 22, 1996 | [JP] | Japan | 8-192426 |
| May 13, 1997 | [JP] | Japan | 9-122375 |

[51] Int. Cl.$^7$ .............................. B29C 71/02; B27K 5/04

[52] U.S. Cl. ............................ 264/83; 264/102; 264/344; 144/361; 144/380

[58] Field of Search ............................. 264/83, 109, 120, 264/101, 102, 125, 126, DIG. 78, 340, 344; 100/383; 156/583.5; 144/359, 364, 380, 361

[56] References Cited

U.S. PATENT DOCUMENTS

| | | | |
|---|---|---|---|
| 1,349,318 | 8/1920 | Camp . | |
| 2,666,463 | 1/1954 | Heritage | 144/380 |
| 3,686,383 | 8/1972 | Makinen | 264/120 |
| 3,887,318 | 6/1975 | DeMets | 425/371 |
| 3,891,738 | 6/1975 | Shen | 264/122 |
| 3,894,569 | 7/1975 | Huttunen | 144/327 |
| 3,942,929 | 3/1976 | DeMets | 425/143 |
| 4,111,744 | 9/1978 | Reiniger . | |
| 4,216,179 | 8/1980 | Lamberts et al. . | |
| 4,233,752 | 11/1980 | Kleinguenther | 34/402 |
| 4,409,170 | 10/1983 | Stofko | 264/113 |
| 4,605,467 | 8/1986 | Bottger | 156/382 |
| 4,850,849 | 7/1989 | Hsu | 264/109 |
| 5,017,319 | 5/1991 | Shen | 264/83 |
| 5,049,334 | 9/1991 | Bach | 264/122 |
| 5,244,608 | 9/1993 | Andersen | 264/26 |
| 5,343,913 | 9/1994 | Tanahashi et al. | 144/361 |

FOREIGN PATENT DOCUMENTS

| | | |
|---|---|---|
| 0383572 | 8/1990 | European Pat. Off. . |
| 0411598 | 2/1991 | European Pat. Off. . |
| 2023547 | 8/1970 | France . |
| 2175170 | 10/1973 | France . |
| 2722356 | 11/1978 | Germany . |
| 3834263 | 4/1990 | Germany . |
| 4009883 | 10/1991 | Germany . |
| 417925 | 7/1966 | Switzerland . |
| 932677 | 7/1963 | United Kingdom . |
| 1275445 | 5/1972 | United Kingdom . |
| 1427566 | 3/1976 | United Kingdom . |

OTHER PUBLICATIONS

Suchsland et al., Fiberboard Manufacturing Practices in the United States, 1991.

MDF Industry Update, Mill Directories 1997, brochure of Sunds Defibrator, Sundsvall, Sweden.

*Primary Examiner*—Jan H. Silbaugh
*Assistant Examiner*—Mark Eashoo
*Attorney, Agent, or Firm*—Armstrong, Westerman, Hattori, McLeland & Naughton

[57] ABSTRACT

A method for dimensional stabilization treatment is disclosed which enables externally supplied high pressure steam to permeate well into interior of wood or wood composite, and which is thereby capable of constantly imparting high dimensional stability to the wood or wood composite. In the method, wood or wood composite W to be treated is held in a sealed space between two press platens 1*a*, 1*b*, and the sealed space is evacuated to establish reduced pressure therein, and thereupon, high pressure steam is supplied to the sealed space. The evacuation may be continued in parallel with the high pressure steam supply.

11 Claims, 6 Drawing Sheets

METHOD FOR DIMENSIONAL STABILIZING TREATMENT OF WOOD AND WOOD COMPOSITE

BACKGROUND OF THE INVENTION

1. Field of the Invention

The present invention relates to a method for dimensional stabilization treatment of wood and wood composite. In particular, it relates to a method for treatment of wood or wood composite which comprises supplying high pressure steam to wood or wood composite under reduced pressure to cause the high pressure steam to penetrate into interior of the wood or wood composite and which is thereby capable of improving dimensional stability of wood or wood composite.

2. Description of the Prior Art

Wood swells and contracts by absorption and exhalation of moisture. The same is true of a plain lumber, a plain thin wood board (thickness: about 0.2 mm to about 10 mm), a particle board, an MDF (medium density fiberboard), an OSB (oriented strand board) and the like. When wood or wood composite is used as a constructional material or furniture material, it is undesirable that the wood or wood composite should swell or contract under the influence of surroundings. Accordingly, wood or wood composite is desired to have dimensional stability less affectable by surroundings.

As measures to deal therewith, a method has been proposed which comprises placing wood or wood composite held between upper and lower press platens in an autoclave, and treating the wood or wood composite with high pressure steam for several minutes to dimensionally stabilize the wood or wood composite. However, this method has disadvantages in that the equipment is undesirably large, and that the high pressure steam doses not penetrate well into interior (center or core portion) of the wood or wood composite, and accordingly, the wood or wood composite is likely to be differently treated between its center portion and peripheral portion.

The inventors of the present application have made extensive experiments and researches to solve the disadvantages, and as a result, they have proposed a method which comprises placing wood or wood composite to be treated between upper and lower hot platens of a press whose hot platens are of a type used in conventional wood treatment, placing an elastic sealing member made of an elastic silicone around the wood or wood composite and a predetermined thickness regulating jig made of a stainless steal or the like around the elastic sealing member to hermetically contain the wood or wood composite, and supplying high pressure steam thereto through steam supplying openings formed in the upper and lower platens to effect dimensional stabilization of the wood or wood composite (Japanese Unexamined Patent Publication No.238616/1994, European Unexamined Patent Publication No.611638).

The treating method disclosed in the publications has advantage in that a press having usual hot platens used in pressing of wood or production of a composite may be used, and accordingly, simple diemnsional stabilization treatment of wood or wood composite is realized. Further, the method for dimensional stabilization treatment of wood or wood composite by means of high pressure steam is capable of applying dimensional stabilization treatment to wood or wood composite without using any chemical agent such as phenol or hormalin, and thus, the method advantageously leaves no chemical agent after the treatment.

While repeatedly practically carrying out the dimensional stabilization of wood or wood composite in accordance with the above treating method, the present inventors have experientially found that in some cases, high pressure steam is not uniformly distributed throughout the wood or wood composite dependently upon, for example, specific gravity, thickness, size, surface condition of the wood or wood composite, and consequently, an intended dimensional stability cannot be attained. In particular, in a natural woodboard prepared by simply cutting a natural wood such as a plain lumber or thin woodboard, pits which are interconnectively present between vessels and tracheids and contribute to movement of moisture are closed. Accordingly, it is difficult even, for example, by preliminary hot-air circulation heating to discharge moisture contained in the interior of such a natural woodboard to the outside, leading to a long drying time. On the other hand, if high pressure steam is supplied, it does not penetrate well into the interior of the woodboard. In consequence, it is difficult to attain desired dimensional stability.

Further, a large amount of energy is required to obtain such high pressure steam having a high temperature. In view of this, it is desired that amount of the high pressure steam be minimized to save a treating cost.

Moreover, if wood or wood composite at room temperature in normal condition, which generally has a water content of at least about 8% to about 10% and a temperature of about 15° C. to 25° C., is placed in a sealed space defined between hot platens or the like without having been subjected to any preliminary treatment, energy of high pressure steam (saturated steam or superheated steam) generated at high cost is used to heat the wood or wood composite to a raised temperature capable of vaporizing moisture contained in the wood or wood composite and of converting the moisture into high pressure steam. This is consumptive in terms of treating time and energy. In addition, if wood or wood composite is a natural woodboard prepared by simply cutting a natural wood such as a plain lumber or thin woodboard, internal moisture is not readily discharged and high pressure steam does not penetrate well, as described above. This leads to a prolonged treating time.

SUMMARY OF THE INVENTION

The present invention has been made in view of the above circumstances. It is, therefore, an object of the present invention to provide a method for dimensional stabilization treatment which enables externally supplied high pressure steam to surely permeate into interior of wood or wood composite in a short time, and which is thereby capable of constantly imparting high dimensional stability to the wood or wood composite in a shortened treating time irrespective of type of the wood or wood composite.

To attain the above object, the present invention provides, as its basic mode, a method for dimensional stabilization treatment of wood or wood composite, said method comprising:

providing a space to be sealed between two press platens, placing wood or wood composite in the space to be sealed, sealing the space, evacuating the sealed space to establish reduced pressure therein, and thereupon, supplying high pressure steam to the sealed space under the reduced pressure for a predetermined period to subject the wood or wood composite contained in the sealed space to high pressure steam treatment, followed by discharge of the high pressure steam to thereby release the pressure. It is to be noted that in parallel with the high pressure steam supply toward the wood or wood composite through one press platen, the evacuation may be continued through the other platen. Further, the high pressure steam supply and the evacuation may be conducted sideways, preferably through sides facing end grains of the wood or wood composite.

A preferred embodiment further comprises:

preliminarily subjecting the wood or wood composite to heat-drying treatment prior to the placement of the wood or wood composite in the space to be sealed to bring water content of the wood or wood composite in air-dried condition to a lower level.

In the present invention, there is no particular restriction with respect to the wood or wood composite to be treated. Not only natural woodboards prepared by simply cutting a natural wood, such as a lumber and a plain wood veneer, but also engineered wood products such as a medium density fiberboard (MDF), an oriented strand board (OSB), a waferboard, and a particle board (PB) may be treated. In a natural woodboard prepared by simply cutting a natural wood, it is particularly effective to subject the natural woodboard to the treatment according to the present invention under compressive force by means of press platens.

The press platens may be those mounted on a press conventionally used in pressing of wood or production of a composite, and may or may not have a heat source. However, it is recommended to use those having a heat source. As the heat source, a heater built in a press platen, heating steam, electric heating means such as a band heater, high frequency heating means such as micro-wave heating means may be used. It is preferred that the space to be sealed be preliminarily heated by the heat source prior to placement of wood or wood composite therein. The space is preferably pre-heated to a temperature within the range which allows dimensional stabilization treatment with high pressure steam to proceed.

After the placement of the wood or wood composite, the space is sealed and evacuated by appropriate means to establish reduced pressure therein. It is preferred that the sealed space be evacuated to reduced pressure of about 60 mmHg to about 750 mmHg. To the sealed space under the reduced pressure, high pressure steam is supplied. When the sealed space is defined between the press platens, each of which has a number of fine openings in communication with the outside, the fine openings of one press platen are connected to a conventional high pressure steam source via, for example, an appropriate tubing and valve means, and the fine openings of the other platen are connected to conventional evacuation means, preferably, a conventional heat-resistant vacuum pump also via, for example, an appropriate tubing and valve means. It is preferred that the tubing for evacuation be connected to a suction blower. By the above arrangement, it is possible to supply high pressure steam toward the wood or wood composite through one press platen while continuing the evacuation through the other press platen. It is, of course, possible to terminate the evacuation when predetermined reduced pressure is establised in the sealed space by evacuating through the tubing for evacuation. Thereupon, high pressure steam is supplied in the sealed space under the reduced pressure.

If desired, a netting such as a wire netting of fine mesh may be interposed between each press platen and wood or wood composite. By virtue of this, injected steam is well dispersed over the surface of the wood or wood composite. Accordingly, it is expected that the steam is uniformly distributed.

The high pressure steam supplied is preferably saturated steam or superheated steam having pressure of several kgf/cm$^2$ to 30 kgf/cm$^2$ and a temperature of 150° C. to 230° C. In the present invention, since the sealed space is brought to reduced pressure, the injected high pressure steam receives the suction force in addition to the injection force. This increases kinetic energy of the high pressure steam. By virtue thereof, the high pressure steam can well penetrate even into interior of the wood or wood composite in a short time and can be distributed uniformly, as compared with conventional methods. In consequence, the dimensional stabilization treatment can be effected rapidly throughout the wood or wood composite.

When the wood or wood composite to be treated is preliminarily subjected to heat-drying treatment to bring water content of the wood or wood composite in air-dried condition to a lower level, preferably to a level at least 1 to 2% lower than the initial level, and the preliminarily heat-dried wood or wood composite is subjected to the high pressure steam treatment in the sealed space, it is possible to save the time required to heat the wood or wood composite to the temperature at which the high pressure steam treatment actually commences. Further, energy of the supplied high pressure steam can be reduced which is required to vaporize water in an amount corresponding to the difference between the initial water content and the reduced water content. This enables minimized energy loss in the high pressure steam treatment and shortened treating time to be realized.

As the heating means in the embodiment further comprising preliminarily subjecting wood or wood composite to be treated to heat-drying treatment, any of means used in conventional heat-drying treatment of wood or wood composite such as a hot-air circulation dryer, jet dryer, infrared (far infrared, near infrared) dryer and hot press, and high frequency heating means such as microwave heating means may be employed. The temperature to which the wood or wood composite is heated by the preliminary heat-drying may be one higher than room temperature to anyhow meet this purpose. However, the temperature is preferably in the range of about 50° C. to the temperature at which the dimentional stabilization treatment with high pressure steam is performed (about 150° C. to about 230° C.).

When the wood or wood composite is a natural woodboard prepared by simply cutting a natural wood, such as a plain lumber or thin woodboard, it is preferred to carry out the preliminary heat-drying treatment by means of high frequency heating such as microwave heating. It is effective to perform hot platen heating and high frequency heating in paralled, for example, by holding wood or wood composite to be treated between heated upper and lower hot platens having function as electrode plates. Of course, high frequency heating may be performed alone. The reason for this is as follows. In a plain woodboard (lumber or thin woodboard), moisture present near end grains and surface is evaporated by heating with a dryer or the like. On the other hand, vaporized moisture in interior of the plain woodboard is not readily discharged. Accordingly, internal steam pressure is increased by high frequency heating. The interior of the plain woodboard is thereby brought into the same condition as high pressure steam-treated condition. Therefore, in a plain woodboard, it is effective to use high frequency heating as the preliminary heat-drying treatment in terms of efficiency of high pressure steam treatment.

After completion of predetermined injection of high pressure steam, the high pressure steam may be discharged immediately to thereby release the pressure, or may be discharged after the system is allowed to stand for a predetermined period of time (preferably about 1 min. to about 2 min.) to thereby release the pressure. The pressure release may be conducted gradually by the steam discharge over a predetermined period of time, or may be conducted in a so-called cold condition in combination with supply of cooling water to the hot platens. According to experiments, when the pressure release is conducted in a cold condition, dimensional change of the resulting final product is small as compared with that in the case of gradual pressure release, and good surface appearance is attained.

DESCRIPTION OF THE PREFERRED EMBODIMENTS

Figure 1:
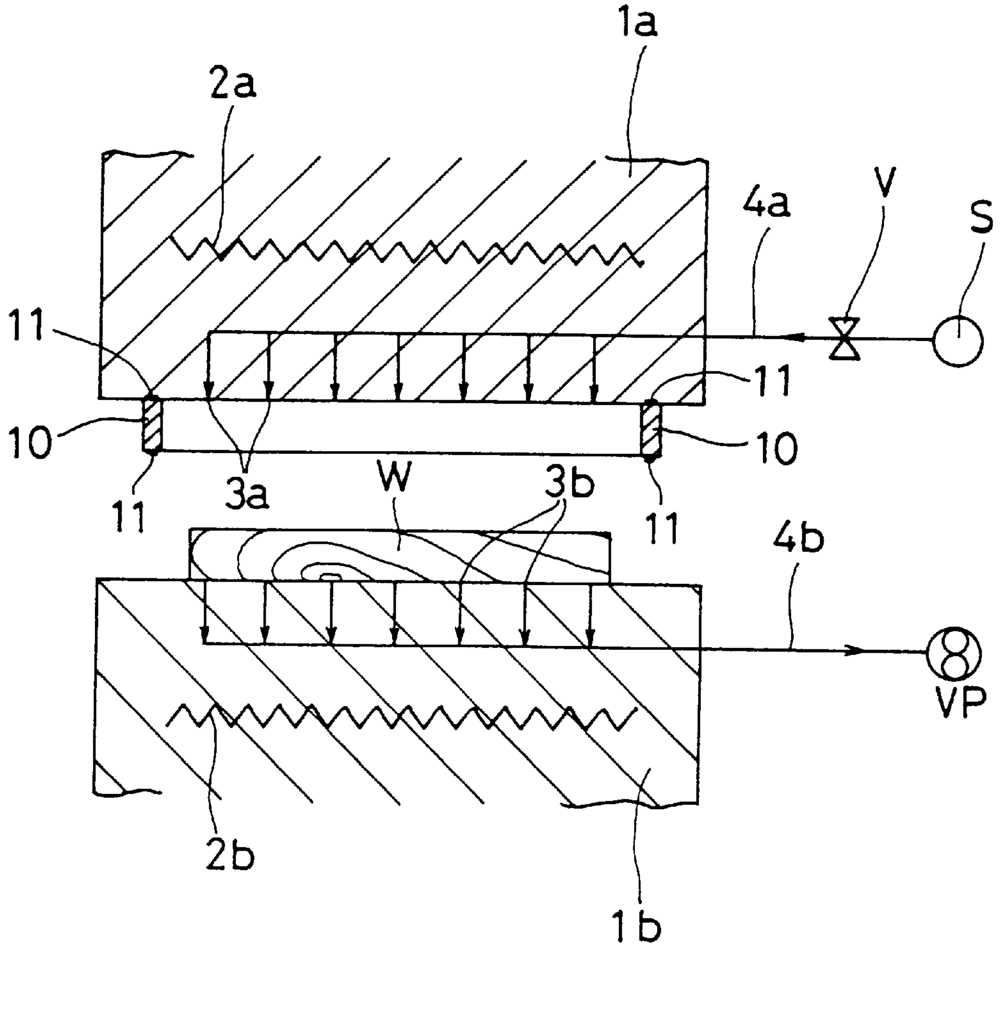
FIG. 1 is an illustration showing one form of an equipment for carrying out the treating method according to the present invention.

In the following, preferred embodiments of the present invention will be described with reference to the accompanying drawings. FIG. 1 shows one form of an equipment for carrying out the method according to the present invention for dimensional stabilization treatment of wood or wood composite. In FIG. 1, reference numbers 1*a*, 1*b* represent upper and lower press platens as usually mounted on a conventional steam platen press used for treating wood and wood composite. The press platens 1*a*, 1*b* are provided with heaters 2*a*, 2*b* as heat sources, and formed with numbers of fine openings 3*a*, 3*b* in their surfaces which are to be pressed against a wood or wood composite to be treated, respectively. The fine openings 3*a* formed in the upper platen 1*a* are in communication with a high pressure steam source S via a tubing 4*a* and an on-off valve V. On the other hand, the fine openings 3*b* formed in the lower platen 1*b* are in communication with a vacuum pump VP via a tubing 4*b*. Instead of the vacuum pump, a blower (not shown in FIG. 1) may be used.

On the upper press platen 1*a*, a substantially square thickness regulating jig 10 made of a stainless steal or the like is fixedly mounted by screws (not shown) or the like to define a space where the wood or wood composite W is to be contained. In this form, the thickness regulating jig 10 has a height slightly larger than thickness of the wood or wood composite W. In FIG. 1, reference number 11 represents elastic sealing members attached to upper and lower ends of the thickness regulating jig 10, which are for establishing sealed condition of the interior of the space.

To carry out the method for stabilization treatment according to the present invention by means of this equipment, wood or wood composite W in the form of a board in a natural state, or wood or wood composite in the form of a board which has been heated by a hot-air dryer (not shown) or the like and thus has a raised temperature and a water content lower than that of air-dried one, is first placed on an area, where the fine openings 3*b* are formed, of the lower press platen 1*b*. Then, the press platens 1*a*, 1*b* are relatively brought close to each other until the movement thereof is restricted by the thickness regulating jig 10, and stopped. Although illustration is omitted, a sealing member made of, for example, an elastic silicone material may be placed around the wood or wood composite W to form a sealed space between the press platens 1*a*, 1*b*.

Under this condition, the vacuum pump VP (or blower)is actuated to evacuate (draw a vacuum) from the fine openings 3*b* formed in the lower press platen 1*b*, thereby establishing vacuum condition in the sealed space. The vacuum pump VP is stopped just before initiation of injection of high pressure steam. The on-off valve V located in the course of the tubing 4*a* relatively nearer to the high pressure steam source S is turned on to inject high pressure steam from the fine openings 3*a* formed in the press platen 1*a*. The evacuation from the fine openings 3*b* formed in the lower press platen 1*b* may be continued in parallel with the injection of high pressure steam. The steam injected from the fine openings 3*a* toward the wood or wood composite W receives the suction force as well as the injection force. This enables the steam to readily and uniformly penetrate even into the core portion of the wood or wood composite W. By virtue of this, water which has been contained in the wood or wood composite W is converted into steam in a short time to advance treatment with high pressure steam.

After the high pressure steam has been injected in a desired amount, steps of pressure release and cooling are conducted to complete the method according to the present invention for dimensional stabilization treatment of wood or wood composite.

Figure 2:
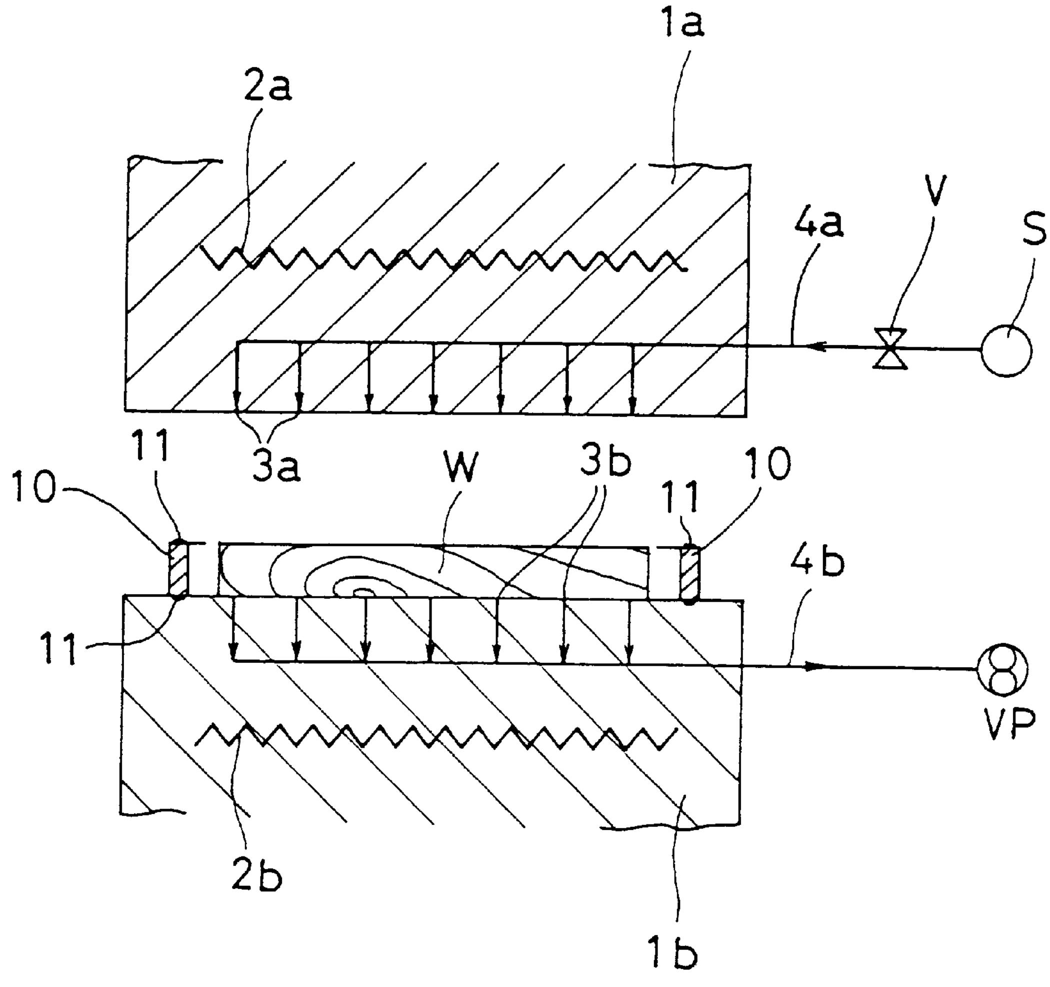
FIG. 2 is an illustration showing another form of the equipment for carrying out the treating method according to the present invention.

FIG. 2 shows another form of the equipment for carrying out the method according to the present invention for dimensional stabilization treatment of wood or wood composite. This equipment is different from the equipment shown in FIG. 1 in that a thickness regulating jig 10 is mounted on a lower press platen 1*b*, and has the same structure with the exception of this point. With this equipment, method for stabilization treatment is conducted in substantially the same manner as in the equipment in FIG. 1.

Figure 3:
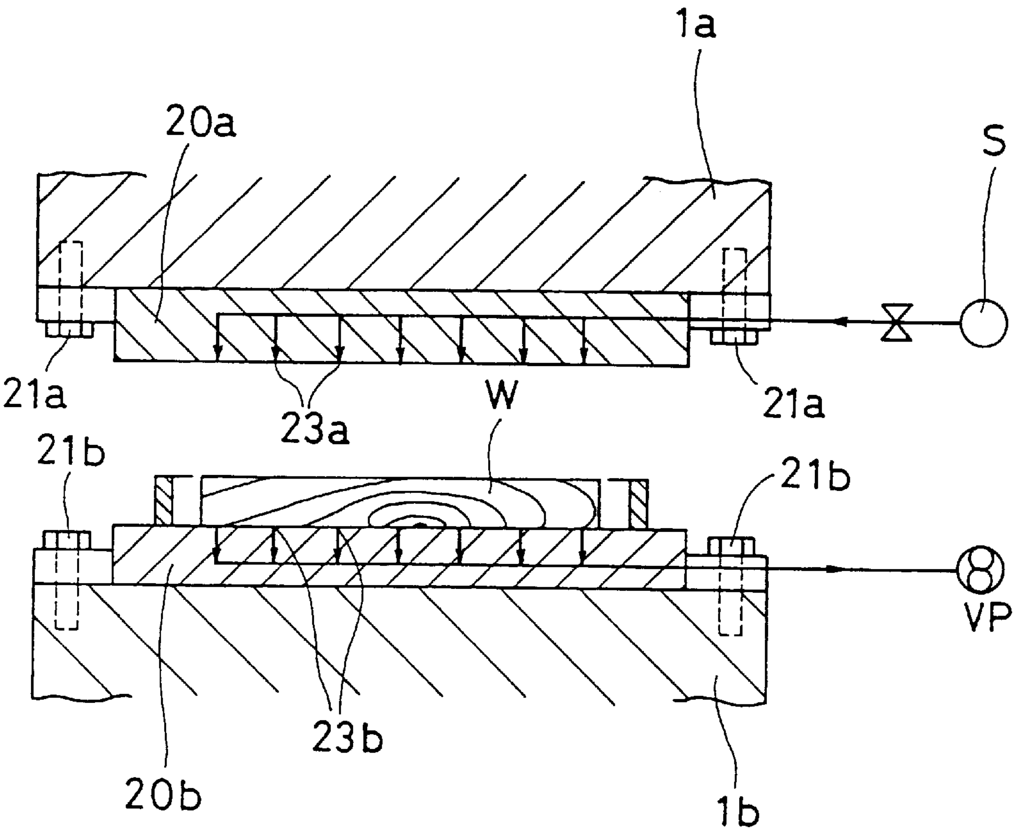
FIG. 3 is an illustration showing still another form of the equipment for carrying out the treating method according to the present invention.

FIG. 3 shows still another form of the equipment for carrying out the method according to the present invention for dimensional stabilization treatment of wood or wood composite. This form is suitable to carry out the method for stabilizing treatment according to the present invention by means of press platens provided with no fine openings in communication with externality. A plate-shaped first additional member 20*a* having fine openings 23*a* for injecting steam is fixedly attached to an upper press platen 1*a* by means of screws 21*a*, and a plate-shaped second additional member 20*b* having fine openings 23*b* for evacuation is fixedly attached to a lower press platen 1*b* by means of screws 21*b*. As in the equipment shown in FIG. 1, the fine openings 23*a* and 23*b* are in communication with a high pressure steam source S and a vacuum pump VP. This equipment is used in substantially the same manner as in that shown in FIG. 1.

Figure 4:
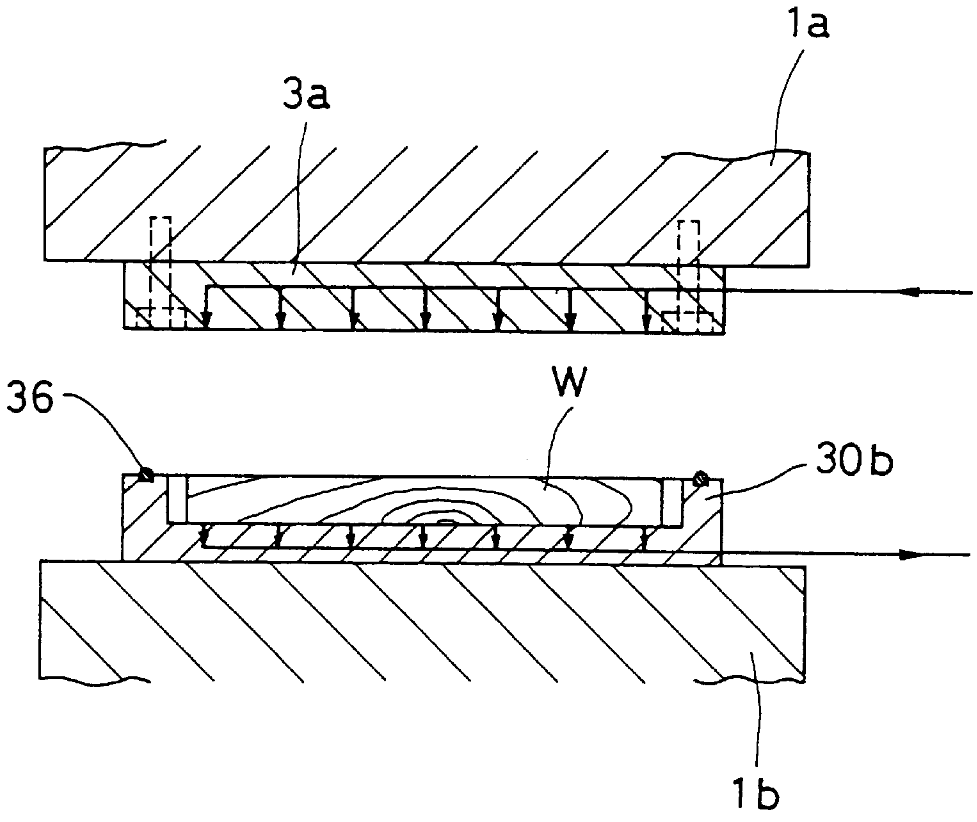
FIG. 4 is an illustration showing a further form of the equipment for carrying out the treating method according to the present invention.

FIG. 4 shows a further form of the equipment for carrying out the method according to the present invention for dimensional stabilization treatment of wood or wood composite. This equipment is different from the equipment shown in FIG. 3 in that a second additional member 30*b* is a lidless box-like pressure vessel having an open concave space 35 and that a packing 36 is attached to the upper end of the second additional member 30*b*. This equipment (arrangement) has advantage that a sealed space is readily formed between the press platens without separately placing a thickness regulating jig 10 or sealing members.

Figure 5:
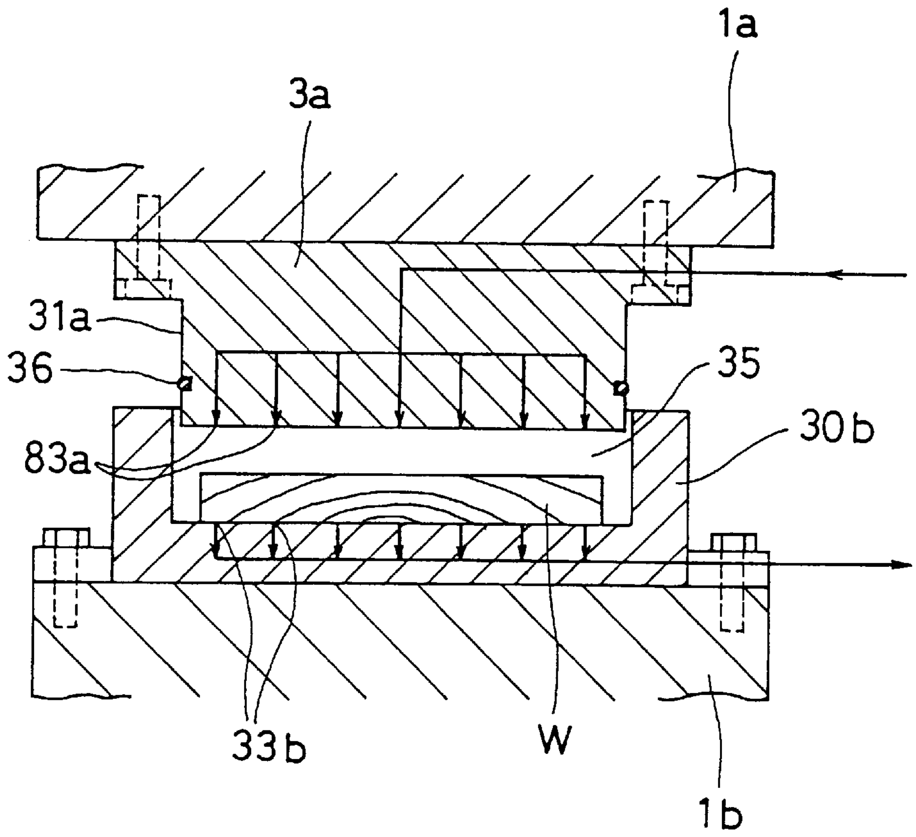
FIG. 5 is an illustration showing a still further form of the equipment for carrying out the treating method according to the present invention.

FIG. 5 shows a still further form of the equipment for carrying out the method according to the present invention for dimensional stabilization treatment of wood or wood composite. This equipment is different from the equipment shown in FIG. 3 in that a second additional member 30*b* is a lidless box-like pressure vessel having an open concave space 35 and that a first additional member 30*a* is provided with an insertable convex portion 31*a* having substantially the same sectional shape as that of the open concave space 35 and has fine openings 33*a* opening to the leading surface of the insertable convex portion 31*a*. The first additional member 30*a* is provided with a packing 36 around the convex portion 31*a*. This equipment has advantage that a sealed space is readily formed between the press platens, and that woods or wood composites W having different thicknesses may be subjected to the dimensional stabilization treatment by adjusting the distance between the press platens 1*a*, 1*b*.

Figure 6:
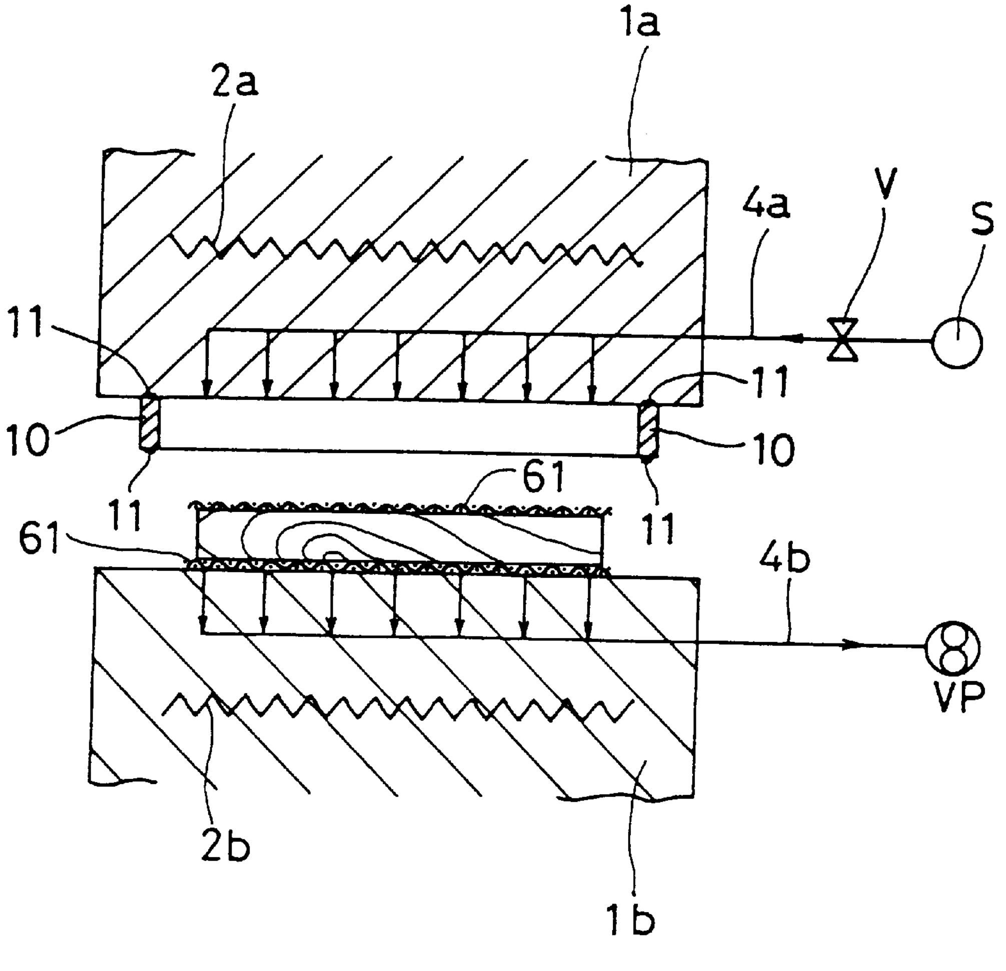
FIG. 6 is an illustration showing another form of an equipment for carrying out the treating method according to the present invention.

FIG. 6 illustrates another form of the equipment for carrying out the method according to the present invention for dimensional stabilization treatment of wood or wood composite. In this equipment, wood or wood composite W is placed between press platens 1*a*, 1*b* with wire meshes 61, 61 of about 100 mesh interposed therebetween, respectively. By virtue of this, supplied high pressure steam is well diffused and thus unifomization of treatment with high pressure steam is facilitated.

In the above description, evacuation is performed through one press platen or one additional member mounted thereon, and high pressure steam is supplied from the other press platen or the other additional member mounted thereon. However, evacuation may be performed through both of the upper and lower press platens or of the additional members. On establishing intended reduced pressure, the valve is operated to terminate the evacuation. To the sealed space thus brought to the reduced pressure, high pressure steam is supplied from both of the upper and lower press platens or of the additional members.

Further, the thickness regulating jig 10 shown in FIG. 1 or 2 may be provided with fine openings opening to inside thereof to perform evacuation and/or to supply high pressure steam through the fine openings. The evacuation and/or supply may be performed alone or in parallel with the evacuation and/or high pressure steam supply througth the upper and lower platens. In this case, high pressure steam positively penetrates into interior of wood or wood composite also through end grains of the wood or wood composite. By virtue of this, uniform raipdness of the treatment can be expected. Further, it will easily be understood that in each of the "additional members" shown in FIGS. 3 to 5, it may be provided with fine openings in its inner sides, and through the fine openings, evacuation and/or high pressure steam supply may be performed.

In the following, the present invention will be described more in detail with reference to Examples.

EXAMPLE 1

Press platens as shown in FIG. 1 were used, each of which had its inner side provided with fine openings of 2 mm in diameter in crisscross rows at intervals of 40 mm. The group of the fine openings of the upper press platen were connected to a high pressure steam source, and the group of the fine openings of the lower press platen were connected to a vacuum pump.

As wood or wood composite to be treated, an M type particle board (30 cm×30 cm) of 15 mm in thickness was used. The particle board was placed on a fine opening group-formed area of the lower press platen. Around the particle board, a thickness regulating jig made of am aluminum plate and having a height of 15 mm was disposed. The particle board was pressed under pressure of 50 $kgf/cm^2$.

Then, the vacuum pump in communication with the group of the fine openings formed in the lower platen was actuated to establish reduced pressure in the resulting sealed space, and while maintaining the reduced pressure, saturated steam (180° C.) having pressure of 10 $kgf/cm^2$ was injected from the group of the fine openings formed in the upper press platen for 10 minutes. The vacuum pump was then stopped and the supply of the steam was also terminated. Then, the high pressure steam in the sealed space was discharged to the ambient atmosphere, thereby releasing the pressure. After platen opening, the treated particle board (Product 1) was taken out from the press.

EXAMPLE 2

A treated wood product (Product 2) was obtained in the same manner as in Example 1 except that the pressure of the saturated steam was changed to 15 $kgf/cm^2$ (200° C.).

EXAMPLE 3

A treated wood product (Product 3) was obtained in the same manner as in Example 1 except that a p type particle board was used instead of the M type particle board as wood or wood composite, and the height of the thickness regulating jig was changed from 15 mm to 16 mm.

COMPARATIVE EXAMPLE 1-1

The same particle board as used in Example 1 was pressed in the same manner as in Example 1. Then, saturated steam (180° C.) having pressure of 10 $kgf/cm^2$ was injected from groups of fine openings formed in upper and lower press platens for 10 minutes. Then, the pressure of the press was released, and the treated wood product (Comparative Product 1-1) was taken out therefrom.

COMPARATIVE EXAMPLE 1-2

A treated wood product (Comparative Product 1-2) was obtained in the same manner as in Comparative Example 1-1 except that the saturated steam was injected for 20 minutes.

EXAMPLE 4

Wood or wood composite was pressed in the same manner as in Example 1, except that an M type MFD (30 cm×30 cm) of 3 mm in thickness was used as the wood or wood composite, and that a thickness regulating jig made of an aluminum plate and having a height of 3 mm was used. Then, a vacuum pump is actuated to establish reduced pressure in the resulting sealed space, and while maintaining the reduced pressure, saturated steam (180° C.) having pressure of 10 $kgf/cm^2$ was injected for 5 minutes. The same subsequent procedure as in Example 1 was conducted to obtain a treated wood product (Product 4).

EXAMPLE 5

A treated wood product (Product 5) was obtained in the same manner as in Example 4 except that the pressure of the saturated steam was changed to 15 $kgf/cm^2$ (200° C.).

COMPARATIVE EXAMPLE 2-1

The same particle board as used in Example 4 was pressed in the same manner as in Example 4. Then, saturated steam (180° C.) having pressure of 10 kgf/$cm^2$ was injected from groups of fine openings formed in upper and lower press platens for 5 minutes. Then, the pressure of the press was released, and the treated wood product (Comparative Product 2-1) was taken out therefrom.

COMPARATIVE EXAMPLE 2-2

A treated wood product (Comparative Product 2-2) was obtained in the same manner as in Comparative Example 2-1 except that the saturated steam was injected for 10 minutes.

[Evaluation Test]

With respect to each of Products 1 to 5, Comparative Products 1-1 and 1-2, Comparative Products 2-1 and 2-2, and untreated wood or wood composites as used in Examples 1 and 4 (Comparative Samples 3 and 4), density (g/$cm^3$), flexural strength (kgf/$cm^2$), peel strength (kgf/$cm^2$), rate (%) of thickness change when soaked in cold water (in accordance with JIS A5908 particle board: at 20° C. for 24 hours), rate (%) of thickness change when cooked (in accordance with A5908 particle board: boiled for 2 hours and then soaked in cold water for 1 hour) were measured. The results are shown in Tables 1 and 2. In Tables 1 and 2, those properties are referred to simply as D., F.S., P.S., TCR in CW, and TCR in BW, respectively, and the same applies in Table 3.

TABLE 1

| | Ex. | | | Comp. Ex. | | |
|---|---|---|---|---|---|---|
| properties | P.1 | P.2 | P.3 | CP.1-1 | CP.1-2 | CP.1-3 |
| D.(g/$cm^3$) | 0.66 | 0.64 | 0.68 | 0.69 | 0.66 | 0.72 |
| F.S.(kgf/$cm^2$) | 210 | 192 | 220 | 222 | 187 | 230 |
| P.S.(kgf/$cm^2$) | 8.0 | 7.5 | 8.5 | 8.0 | 7.9 | 8.2 |
| TCR in CW (%) | 2.2 | 2.1 | 2.3 | 5.1 | 2.9 | 6.2 |
| TCR in BW (%) | 15 | 12 | 15 | 53 | 20 | 82 |

TABLE 2

| | Ex. | | Comp.Ex. | | |
|---|---|---|---|---|---|
| properties | P.4 | P.5 | CP.2-1 | CP.2-2 | CP.4 |
| D.(g/$cm^3$) | 0.65 | 0.63 | 0.68 | 0.66 | 0.72 |
| F.S.(kgf/$cm^2$) | 343 | 328 | 369 | 333 | 386 |
| P.S.(kgf/$cm^2$) | 11.3 | 10.3 | 12.8 | 11.0 | 13.2 |
| TCR in CW (%) | 1.8 | 1.6 | 4.2 | 2.1 | 5.2 |
| TCR in BW (%) | 30 | 28 | 40 | 33 | 45 |

As shown in Tables 1 and 2, Products subjected to the method according to the present invention for dimensional stabilization treatment were greatly improved in both rate of thickness change when soaked in cold water and rate of thickness change when cooked as compared with the untreated Comparative Samples and Comparative Products which were treated with high pressure steam without evacuation. Therefore, the treatment according to the present invention was confirmed to be effective.

It was found that even with the treatments in a short time, substantially comparable results were obtained.

EXAMPLE 6

Press platens capable of providing a sealed space as shown in FIG. 1 were used, each of which had its inner side provided with fine openings of 2 mm in diameter in criss-cross rows at intervals of 40 mm. The group of the fine openings of the upper press platen were connected to a high pressure steam source, and the group of the fine openings of the lower press platen were connected to a vacuum pump. A thickness regulating jig made of an aluminum plate 10 and having a height of 15 mm was used.

As wood or wood composite to be treated, an M type particle board (30 cm×30 cm) of 15 mm in thickness was used. The particle board was placed on a fine opening group-formed area of the lower press platen. The upper platen was lowered to press the particle board under pressure of 50 kgf/$cm^2$, thereby forming a sealed space.

Then, the vacuum pump in communication with the group of the fine openings formed in the lower platen was actuated to reduce pressure in the sealed space to 60 mmHg. After completion of the pressure reduction, a valve is closed to stop the vacuum pump.

Then, saturated steam (200° C.) having pressure of 15 kgf/$cm^2$ was injected from the group of the fine openings formed in the upper press platen for 10 minutes.

Thereafter, the high pressure steam was discharged from the sealed space, thereby releasing the pressure. After platen opening, the treated particle board (Product 6) was taken out from the press.

EXAMPLE 7

A treated wood product (Product 7) was obtained in the same manner as in Example 6 except that a p type particle board was used instead of the M type particle board as wood or wood composite, and the height of the thickness regulating jig was changed from 15 mm to 16 mm.

EXAMPLE 8

Wood or wood composite was pressed in the same manner as in Example 6, except that an M type MDF (30 cm×30 cm) of 3 mm in thickness was used as the wood or wood composite, and that a thickness regulating jig made of an aluminum plate and having a height of 3 mm was used. Then, pressure in the resulting sealed space was reduced to 60 mmHg by means of a vacuum pump. Saturated steam (200° C.) having pressure of 15 kgf/$cm^2$ was injected for 5 minutes.

The same subsequent procedure as in Example 5 was conducted to obtain a treated wood product (Product 8).

[Evaluation Test]

With respect to each of Products 6 to 8, as in each of Products 1 to 5, density (g/$cm^3$), flexural strength (kgf/$cm^2$), peel strength (kgf/$cm^2$), rate (%) of thickness change when soaked in cold water (in accordance with JIS A5908 particle board: at 20° C. for 24 hours), rate (%) of thickness change when cooked (in accordance with A5908 particle board: boiled for 2 hours and then soaked in cold water for 1 hour) were measured. The results are shown in Table 3.

TABLE 3

| | Ex. | | |
|---|---|---|---|
| properties | P.6 | P.7 | P.8 |
| D.(g/$cm^3$) | 0.65 | 0.67 | 0.64 |
| F.S.(kgf/$cm^2$) | 208 | 220 | 333 |
| P.S.(kgf/$cm^2$) | 8.0 | 8.5 | 10.8 |

TABLE 3-continued

| properties | Ex. P.6 | P.7 | P.8 |
|---|---|---|---|
| TCR in CW (%) | 1.8 | 1.9 | 1.4 |
| TCR in BW (%) | 10 | 11 | 22 |

As shown in Table 3, Products 6 to 8 showed results substantially comparable or superior to Products 1 to 5 in all of the properties measured. Therefore, the treatment method in which the high pressure steam was injected after completion of the pressure reduction in the sealed space was confirmed to be effective, as the previous was confirmed to be.

EXAMPLE 9

A particle board having a size of 15 mm×300 mm×1800 mm and water content at room temperature of 8.2% was heat-treated by means of a high-frequency press (13.56 MHz high-frequency wave, 200V and 8 kw output) at a platen temperature of 150° C. for 4 minutes to reduce the water content to 3.4%. The particle board was placed into a pressure vessel 30*a*, 30*b* (internal volume: 16 mm×330 mm×1850 mm) heated at 195° C. by means of hot platen heating. In this connection, the particle board just prior to the placement had a temperature of 147° C.

The pressure vessel was evacuated to reduce pressure therein to 700 mmHg. Thereupon, the evacuation was terminated. Into the vessel, saturated steam (195° C.) having pressure of 14 kgf/cm$^2$ was injected for 15 minutes. After completion of the steam supply, a pressure releasing valve was opened to return the pressure to atmospheric pressure. Then, the treated wood product (Product 9) was taken out.

COMPARATIVE EXAMPLE 5

A particle board having a size of 15 mm×300 mm×1800 mm and water content at room temperature of 8.2% was placed into a pressure vessel (internal volume: 16 mm×330 mm×1850 mm) heated at 195° C. by means of hot platen heating, without any preliminary heat-drying treatment.

The pressure vessel was evacuated to reduce pressure therein to 700 mmHg. Thereupon, the evacuation was terminated. Into the vessel, saturated steam (195° C.) having pressure of 14 kgf/cm$^2$ was injected for 25 minutes. After completion of the steam supply, a pressure releasing valve was opened to return the pressure to atmospheric pressure. Then, the treated wood product (Comparative Product 5) was taken out.

EXAMPLE 10

An MDF having a size of 15 mm×300 mm×1800 mm and water content at room temperature of 7.7% was heat-dried by means of a hot-air circulating dryer at 150° C. over a period of 30 minutes to reduce the water content to 3.5%. The MDF was placed into a pressure vessel (internal volume: 16 mm×330 mm×1850 mm) heated at 205° C. by means of steam heating. In this connection, the particle board just prior to the placement had a temperature of 146° C.

The pressure vessel was evacuated to reduce pressure therein to 700 mmHg. Thereupon, the evacuation was terminated. Into the vessel, saturated steam (205° C.) having pressure of 17.5 kgf/cm$^2$ was injected for 10 minutes. After completion of the steam supply, a pressure releasing valve was opened to return the pressure to atmospheric pressure. Then, the treated wood product (Product 10) was taken out.

COMPARATIVE EXAMPLE 6

An MDF having a size of 15 mm×300 mm×1800 mm and water content at room temperature of 7.7% was placed into a pressure vessel (internal volume: 16 mm×330 mm×1850 mm) heated at 205° C. by means of steam heating as in the pressure vessel of Example 10, without preliminary heat-drying treatment.

The pressure vessel was evacuated to reduce pressure therein to 700 mmHg. Thereupon, the evacuation was terminated. Into the vessel, saturated steam (205° C.) having pressure of 17.5 kgf/cm$^2$ was injected for 20 minutes. After completion of the steam supply, a pressure releasing valve was opened to return the pressure to atmospheric pressure. Then, the treated wood product (Comparative Product 6) was taken out.

EXAMPLE 11

Press platens as shown in FIG. 1 were used, each of which had its inner side provided with fine openings of 2 mm in diameter in crisscross rows at intervals of 40 mm. The group of the fine openings of the upper press platen were connected to a high pressure steam source, and the group of the fine openings of the lower press platen were connected to a vacuum pump.

An OSB having a size of 15 mm×300 mm×1800 mm and water content at room temperature of 7.1% was used as wood or wood composite to be treated. The OSB was heat-dried by means of a hot-air circulating dryer at 170° C. over a period of 30 minutes to reduce the water content to 2.9%. Then, the OSB was placed on a fine opening group-formed area of the lower press platen heated at 200° C. by a heater. The upper platen also heated at 200° C. and provided with a square sealing frame of 15 mm in thickness was moved to press the OSB under pressure of 50 kgf/cm$^2$. In this connection, the OSB just prior to the placement had a temperature of 167° C.

Then, saturated steam (200° C.) having pressure of 15 kgf/cm$^2$ was injected from the group of the fine openings formed in the upper press platen for 12 minutes while actuating the vacuum pump in communication with the group of the fine openings formed in the lower press platen. The vacuum pump was stopped when the steam supply was completed. Thereafter, the pressure was released, and the treated OSB (Product 11) was taken out.

COMPARATIVE EXAMPLE 7

Substantially the same treatment as in Example 11 was performed except that an OSB having a size of 15 mm×300 mm×1800 mm and water content at room temperature of 7.1% was used as wood or wood composite to be treated, without any preliminary heat-drying treatment, and that saturated steam was supplied for 22 minutes.

EXAMPLE 12

Press platens as shown in FIG. 1 were used, each of which had its inner side provided with fine openings of 2 mm in diameter in crisscross rows at intervals of 40 mm. The group of the fine openings of the upper press platen were connected to a high pressure steam source, and the group of the fine openings of the lower press platen were connected to a vacuum pump.

A sugi lumber having a size of 15 mm×300 mm×1800 mm and water content at room temperature of 7.1% was heat-treated by means of a high-frequency press (13.56 MHz high-frequency wave, 200V and 8 kw output) at a platen temperature of 150° C. for 4 minutes to reduce the water content to 5.1%. The sugi lumber was placed on a fine opening group-formed area of the lower press platen heated at 200° C. by an electric heater. The upper platen also heated at 200° C. and provided with a square sealing frame of 15 mm in thickness was moved to press the sugi lumber under pressure of 50 kgf/cm$^2$. In this connection, the sugi lumber just prior to the placement had a temperature of 147° C.

The sealed space resulting from the lowering the upper platen was evacuated to reduce pressure therein to 700 mmHg. Thereupon, the evacuation was terminated. Into the sealed space under the reduced pressure, saturated steam (200° C.) having pressure of 15 kgf/cm$^2$ was injected for 15 minutes. After completion of the steam supply, the pressure was released. The treated wood product (Product 12) was then taken out.

COMPARATIVE EXAMPLE 8

Substantially the same treatment as in Example 12 was performed except that a sugi lumber having a size of 15 mm×300 mm×1800 mm and water content at room temperature of 7.0% was used as wood or wood composite to be treated, without any preliminary heat-drying treatment, and that saturated steam wad supplied for 25 minutes.

COMPARATIVE EXAMPLE 9

Reference Example 1

Substantially the same treatment as in Example 12 was performed except that a sugi lumber having a size of 15 mm×300 mm×1800 mm and water content at room temperature of 7.1% was heat-dried by means of a hot-air circulating dryer at 150° C. over a period of 30 minutes to reduce the water content to 4.0%, and that saturated steam wad supplied for 15 minutes.

[Evaluation Test]

With respect to each of Products 9 to 12, Comparative Products 5 to 9, and untreated wood or wood composites as used in Examples and Comparative Examples, coefficient of expansion in the thickness direction and flexural strength (kgf/cm$^2$) were determined. The results are shown in Table 4. In Table 4, untreated PB, untreated MDF, undteated OSB and untreated sugi Lumber are referred to simply as PB, MDF, OSB and sugi lumber, respectively. Further, coefficient of expansion, flexural strength, treating time and water content are referred simply as E.C., F.S., T.T and W.C., respectively.

The coefficient of expansion in the thickness direction is represented by the formula: [(T1−T0)/T0]×100, wherein T0 is a thickness in absolute dry condition and T1 is a thickness in water-saturated condition. In this connection, with respect to each of the sugi lumber and sugi lumber-derived Products, coefficient of expansion in R direction (radial direction) was determined.

TABLE 4

| | E.C. (%) | F.S. (kgf/cm$^2$) | T.T. (min.) | W.C. (%) |
|---|---|---|---|---|
| P.9 | 9.6 | 193 | 15 | 3.4 |
| CP.5 | 10.1 | 172 | 25 | 8.2 |
| PB | 17.1 | 230 | — | 8.1 |
| P.10 | 6.7 | 283 | 10 | 3.5 |
| CP.6 | 6.5 | 251 | 20 | 7.7 |
| MDF | 10.6 | 340 | — | 7.6 |
| P.11 | 8.1 | 422 | 12 | 2.9 |
| CP.7 | 7.9 | 342 | 22 | 7.0 |
| OSB | 22.3 | 485 | — | 7.1 |
| P.12 | 4.9 | 632 | 15 | 5.1 |
| CP.8 | 7.8 | 539 | 25 | 7.0 |
| CP.9 | 6.3 | 631 | 15 | 4.0 |
| sugi lumber | 9.7 | 718 | — | 7.1 |

[Discussion]

As shown in Table 4, by virtue of the preliminary treatment by heat-drying to reduce water content, each of Products according to the present invention showed expansion coefficient and flexural strength comparable to those of Comparative Products subjected to high pressure steam treatment without such preliminary treatment, although the former was treated with high pressure steam in a treatment time shorter than those of the latter. As understood from comparison between Products 12 and Comparative Products 8 and 9, the high frequency heating is effective as means for preliminary heat-drying treatment. If the steam treatment times are the same, Product 12 is superior.

As described above, according to the method for dimensional stabilization treatment of wood or wood composite, effects comparable to those by conventional methods can be obtained in a shorter time for high pressure steam treatment. This enables a reduced cost of generation of high pressure steam to be realized, leading to a reduced unit cost of treatment. Further, the shortened time necessary for treatment with high pressure steam is attained. This enables working life of the sealing member or the like to be prolonged, thereby leading to a reduced cost in terms of equipments. Moreover, the heat treatment time is shortened, thereby minimizing deterioration of an adhesive used in wood or wood composite or deterioration of the wood or wood composite itself.

What is claimed is:

1. A method for dimensional stabilization treatment of wood or wood composite, comprising:

providing a space to be sealed between upper and lower press platens, placing wood or wood composite, said wood or wood composite selected from the group consisting of natural wood as lumber and wood veneer, medium density fiberboard, oriented strand board, wafer board and particle board, in the space to be sealed, sealing the space by a sealing member disposed between the press platens for closing the space, first evacuating the sealed space through fine openings provided in said lower platen to establish reduced pressure in the sealed space, and then supplying high pressure steam through fine openings provided in said upper platen to the sealed space under the reduced pressure for a predetermined period to subject the wood or wood composite contained in the sealed space to high pressure steam treatment, wherein the high pressure steam applied from the upper platen penetrates into the interior of the wood or wood composite while the reduced pressure is applied on a lower surface of the wood or wood composite to uniformly distribute the high pressure steam throughout the wood or wood composite whereby the dimensional stability is improved, including rate of thickness change when soaked in cold water or boiled in water.

2. A method for dimensional stabilization treatment of wood or wood composite, comprising:

providing a space to be sealed between two press platens, placing wood or wood composite, said wood or wood composite selected from the group consisting of natural wood as lumber and wood veneer, medium density fiberboard, oriented strand board, wafer board and particle board, in the space to be sealed, sealing the space by a sealing member disposed between the press platens for closing the space, first evacuating the sealed space through fine openings provided in said one or both of the press platens to establish reduced pressure in the sealed space, and then supplying high pressure steam toward the wood or wood composite in the sealed space under the reduced pressure for a predetermined period through fine openings provided in one or both of the press platens to subject the wood or wood composite contained in the sealed space to high pressure steam treatment, wherein the high pressure steam applied from one platen penetrates into the interior of the wood or wood composite while the reduced pressure is applied on the opposite side of the wood or wood composite by the other platen to uniformly distribute the high pressure steam throughout the wood or wood composite whereby the dimensional stability is improved, including rate of thickness change when soaked in cold water or boiled in water.

3. A method for dimensional stabilization treatment of wood or wood composite, comprising:

providing a space to be sealed between two press platens, placing wood or wood composite, said wood or wood composite selected from the group consisting of natural wood as lumber and wood veneer, medium density fiberboard, oriented strand board, wafer board and particle board, in the space to be sealed, sealing the space by a sealing member disposed between the press platens for closing the space, first evacuating the sealed space through sides thereof to establish reduced pressure in the sealed space, and then supplying high pressure steam toward the wood or wood composite in the sealed space for a predetermined period through the sides of the sealed space to subject the wood or wood composite contained in the sealed space to high pressure steam treatment, wherein the high pressure steam applied from one side of the wood or wood composite penetrates into the interior thereof while the reduced pressure is applied on the opposite side of the wood or wood composite to uniformly distribute the high pressure steam throughout the wood or wood composite whereby the dimensional stability is improved, including rate of thickness change when soaked in cold water or boiled in water.

4. The method according to any one of claims 1 to 3, wherein the evacuation is continued in parallel with the high pressure steam supply to the wood or wood composite.

5. The method according to any one of claims 1 to 3, wherein the sealed space is evacuated to the reduced pressure of about 60 mmHg to about 750 mmHg.

6. The method according to any one of claims 1 to 3, wherein the high pressure steam supplied is saturated steam or superheated steam having pressure of several $kgf/cm^2$ to 30 $kgf/cm^2$ and a temperature of 150° C. to 230° C.

7. The method according to any one of claims 1 to 3, wherein the wood or wood composite is placed in the space to be sealed with nettings interposed between upper and lower surfaces of the wood or wood composite and surfaces of the presses, respectively.

8. The method according to any one of claims 1 to 3, further comprising:

preliminarily subjecting the wood or wood composite to a heat-drying treatment prior to the placement of the wood or wood composite in the space to be sealed to bring water content of the wood or wood composite in an air-dried condition to a lower level.

9. The method according to claim 8, wherein the water content of the wood or wood composite is brought to a level at least 1 to 2% lower than its initial level.

10. The method according to claim 8, wherein the wood or wood composite is a natural wood material selected from the group consisting of a lumber and a wood veneer, and preliminary subjected to heat-drying treatment by high-frequency heating.

11. The method according to claim 8, wherein the wood or wood composite is placed in the space to be sealed with wire meshes interposed between upper and lower surfaces of the wood or wood composite and surfaces of the presses, respectively.

* * * * *